United States Patent
Birchbauer et al.

(10) Patent No.: US 11,237,289 B2
(45) Date of Patent: Feb. 1, 2022

(54) SYSTEM FOR DETERMINING THE LOCATION OF PIPELINES

(71) Applicant: Siemens Aktiengesellschaft, Munich (DE)

(72) Inventors: Josef Alois Birchbauer, Seiersberg (AT); Uwe Linnert, Fürth (DE); Klaus Ludwig, Erlangen (DE); Markus Richter, Erfurt (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 0 days.

(21) Appl. No.: 16/464,920

(22) PCT Filed: Nov. 8, 2017

(86) PCT No.: PCT/EP2017/078546
§ 371 (c)(1),
(2) Date: May 29, 2019

(87) PCT Pub. No.: WO2018/099699
PCT Pub. Date: Jun. 7, 2018

(65) Prior Publication Data
US 2020/0012005 A1    Jan. 9, 2020

(30) Foreign Application Priority Data
Nov. 30, 2016  (DE) .................. 10 2016 223 774.8

(51) Int. Cl.
| | |
|---|---|
| *G01V 3/08* | (2006.01) |
| *G01V 3/16* | (2006.01) |
| *F16L 55/48* | (2006.01) |
| *F16L 101/30* | (2006.01) |

(52) U.S. Cl.
CPC .............. *G01V 3/081* (2013.01); *F16L 55/48* (2013.01); *G01V 3/16* (2013.01); *F16L 2101/30* (2013.01)

(58) Field of Classification Search
CPC . G01V 3/081; G01V 3/15; G01V 3/16; G01V 3/165; G01V 3/17; F16L 55/26; F16L 55/48
See application file for complete search history.

(56) References Cited

U.S. PATENT DOCUMENTS

| | | | |
|---|---|---|---|
| 4,427,943 A | 1/1984 | Cloutier et al. | |
| 6,243,657 B1 * | 6/2001 | Tuck ................. | G01N 29/2412 702/150 |

(Continued)

FOREIGN PATENT DOCUMENTS

| | | |
|---|---|---|
| CN | 102169185 | 8/2011 |
| CN | 102269825 | 12/2011 |

(Continued)

OTHER PUBLICATIONS

Stoll Johannes B.:"Unmanned AI RCRAFT Systems for Rapid Near Surface Geophysical Measurements" International Archives of the Photogrammetry, Remote Sensing and Spatial Information Sciences, vol. XL-I/W2, 2013, pp. 391-394, XP055450543, DOI: 10.5194/isprsarchives-XL-I-W2-391-2013 Gefunden im Internet: URL:https://www.int-arch-photogramm-remote-sens-spatial-inf-sci.net/XL-I-W2/391/2013/isprsarchives-XL-I-W2-391-2013.pdf [gefunden am Feb. 13, 2018]; chapter 2. Technical approach; chapter 6. Detection of magnetic signatures after a major landslide; fig. 9; 2013.

*Primary Examiner* — Reena Aurora
(74) *Attorney, Agent, or Firm* — Cozen O'Connor

(57) ABSTRACT

A system for determining the location of pipelines using at least one geopig that is introduced into a pipeline, advances therein and that has a magnetic source for generating a magnetic field, wherein at least one unmanned aerial vehicle is provided with magnetic field sensors and position determination devices, a controller is provided for determining the field strength profile of the magnetic field and for (Continued)

positioning the unmanned aerial vehicle at a defined distance from the at least one geopig, and a device is provided for determining the location of the at least one geopig from the position of the unmanned aerial vehicle and the defined distance between the at least one geopig and the unmanned aerial vehicle.

9 Claims, 1 Drawing Sheet

(56) References Cited

U.S. PATENT DOCUMENTS

| | | | | |
|---|---|---|---|---|
| 6,553,322 | B1 * | 4/2003 | Ignagni | F16L 55/48 |
| | | | | 701/32.4 |
| 6,816,110 | B1 * | 11/2004 | Liu | F16L 55/48 |
| | | | | 342/357.32 |
| 2009/0013806 | A1 * | 1/2009 | Miller | F16L 55/48 |
| | | | | 73/865.8 |
| 2017/0268714 | A1 | 9/2017 | Giron et al. | |

FOREIGN PATENT DOCUMENTS

| | | |
|---|---|---|
| CN | 104297596 | 1/2015 |
| CN | 106092082 | 11/2016 |
| DE | 4406681 | 9/1995 |
| GB | 2297666 | 8/1996 |
| RU | 2503038 | 12/2013 |
| WO | WO2014/189943 | 11/2014 |

* cited by examiner

SYSTEM FOR DETERMINING THE LOCATION OF PIPELINES

CROSS-REFERENCE TO RELATED APPLICATIONS

This is a U.S. national stage of application No. PCT/EP2017/078546 filed Nov. 8, 2017. Priority is claimed on DE Application No. 102016223774.8 filed Nov. 30, 2016, the content of which is incorporated herein by reference in its entirety.

BACKGROUND OF THE INVENTION

1. Field of the Invention

The invention relates to a system for determining the location of pipelines having at least one geopig that is introduced into a pipeline and moves forward in the pipeline and comprises a magnetic source for generating a magnetic field.

2. Description of the Related Art

When performing inspection tasks, it is necessary to know the very precise location of subsoil pipelines, such as pipelines for gas, oil, or water. Once these pipelines are laid and the ground region is restored, the pipelines and particularly the location of their upper edge are usually no longer visible from the outside.

During the procedure of laying new pipelines, the location of the pipelines is recorded with cadastral accuracy using contemporary methods during the laying procedure, in other words prior to restoring the ground region. However, in the past, the locations of older pipelines were not recorded with sufficient accuracy when laying pipelines. In addition, it is possible as a result of unstable subsoils, such as marshlands or desert sand, that the location of the pipeline embedded in the subsoil changes.

Methods for locating pipelines and accordingly their metal structure in the ground are known from the prior art.

This method is performed close to the surface of the ground by way of example using hand-held devices, such as devices marketed by the CORROCONT Group, which favors the transmission of the coupled measurement signal and thus the sensitivity of the measuring procedure.

Other methods for the internal inspection of pipelines use "geopigs" that are introduced into the pipeline and are moved forward via the flow of the transported medium in the pipeline. The position of the geopig is determined via inertial measuring systems.

These systems are encumbered with the disadvantage that their measurement results drift, i.e., the incremental feedforward determination causes error propagation in the results.

Owing to the lack of contact with the outside world, it is not possible to compensate this error behavior, for instance, via external and thus absolute measuring procedures, where the mainly metal structure of the pipeline particularly represents an obstacle that distorts the transmission of radio signals (electrical fields) (Faraday cage).

Pigging is described, for example, at WIKIPEDIA. As such, it is known from the prior art to attach to the outer skin of the pipeline acoustic or magnetic locating devices or locating devices that use wireless technology, where the locating devices can detect the passage of the geopig.

This form of sensor technology is, however, not available in particular for the poorly calibrated locations of older pipelines.

SUMMARY OF THE INVENTION

In view of the foregoing, it is therefore an object of the invention to further develop the prior art and in particular to improve the use of geopigs for surveying pipelines.

This and other objects and advantages are achieved in accordance with the invention by a system, where at least one unmanned aerial vehicle is provided with magnetic field sensors and position determining devices, and a controller is provided for determining the course of the field strength of a magnetic field and for positioning the unmanned aerial vehicle at a defined distance from a geopig and where means are provided for determining the location of the geopig from the position of the unmanned aerial vehicle and the defined distance between the geopig and the unmanned aerial vehicle.

BRIEF DESCRIPTION OF THE DRAWINGS

The invention is explained in detail with reference to the figures, in which.

DETAILED DESCRIPTION OF THE EXEMPLARY EMBODIMENTS

The figures illustrate the use of a geopig GM for determining the location of a pipeline RL.

The geopig GM is equipped with a magnetic source MQ that generates a magnetic field. The course of the field strength of the magnetic field is detected via a magnetic field sensor MFS that is attached to an unmanned aerial vehicle UAV and spatially allocated.

The unmanned aerial vehicle UAV follows the maximum of the magnetic signal at a predetermined flight height and positions itself in each case at a defined distance from the geopig GM, by way of example, directly above the geopig GM.

Therefore, the movement of the geopig GM in the pipeline RL also causes the unmanned aerial vehicle UAV to follow the course of the pipeline RL.

The location and course of the pipeline RL are ascertained from the position of the unmanned aerial vehicle UAV, which is continuously determined using satellite navigation, and from the distance between the geopig GM and the unmanned aerial vehicle UAV, where distance is determinable from the course of the field strength of the magnetic field MF. In addition, the location of the pipeline RL can be determined from a sequence of ascertained positions of the geopig GM while it is moving.

In so doing, it is expedient if the data that is obtained using inertial measuring systems and that relates to the position of the geopig is likewise used in the procedure of determining the location and course of the pipeline RL.

Permanent magnets or magnetic coils are, by way of example, conceivable as the magnetic source.

It is advantageous to use a coil to which an alternating current is applied as a magnetic source MQ for generating an alternating magnetic field MF at an impressed frequency signature, with the result that it is possible to identify interference signals.

It is expedient for this purpose if the frequency and field strength of the magnetic field MF are adjusted to suit the characteristics of the pipeline RL in order that the eddy currents that are induced therein are minimal.

It is also advantageously possible to configure the magnetic field MF as a constant field that has an alternating field superimposed on it because it is possible to improve the alternating field permeability of magnetic materials by superimposing the alternating field on a constant field that magnetically saturates the material at a corresponding point.

In order to avoid the pig magnetically attaching itself to the surrounding pipe, the magnetic constant field should continue to extend within the pipe as symmetrically possible.

Figure 1:
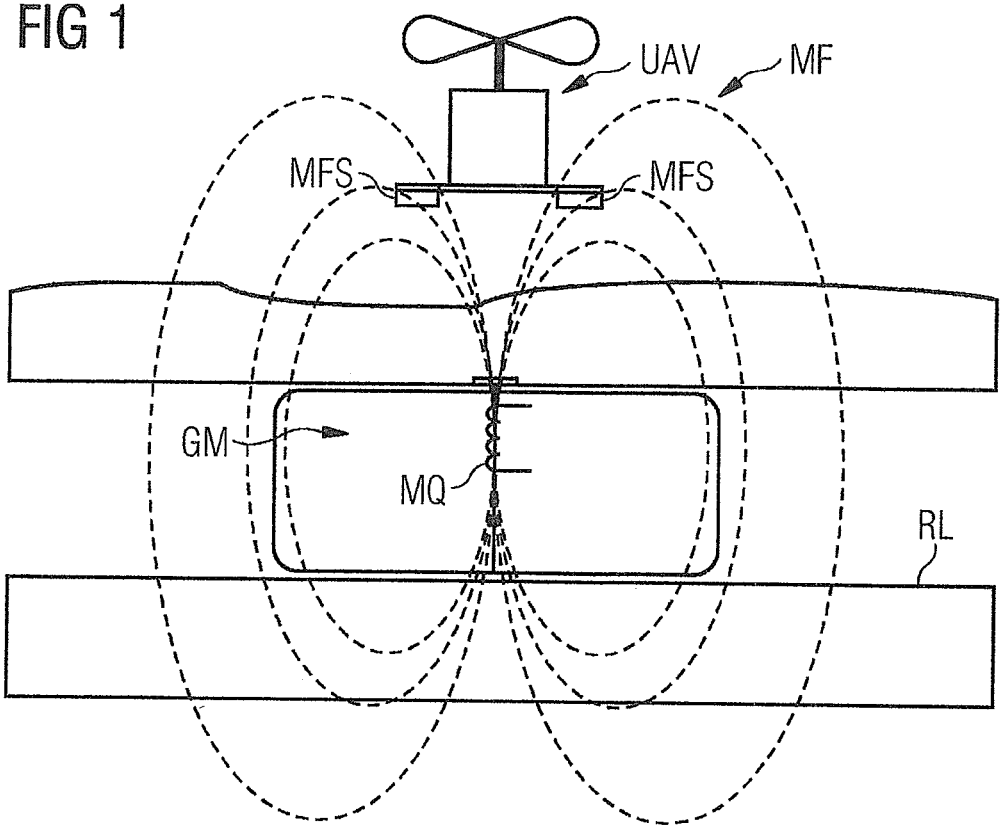
FIG. 1 shows the use of a system in accordance with the invention in a schematic and side view.
Figure 2:
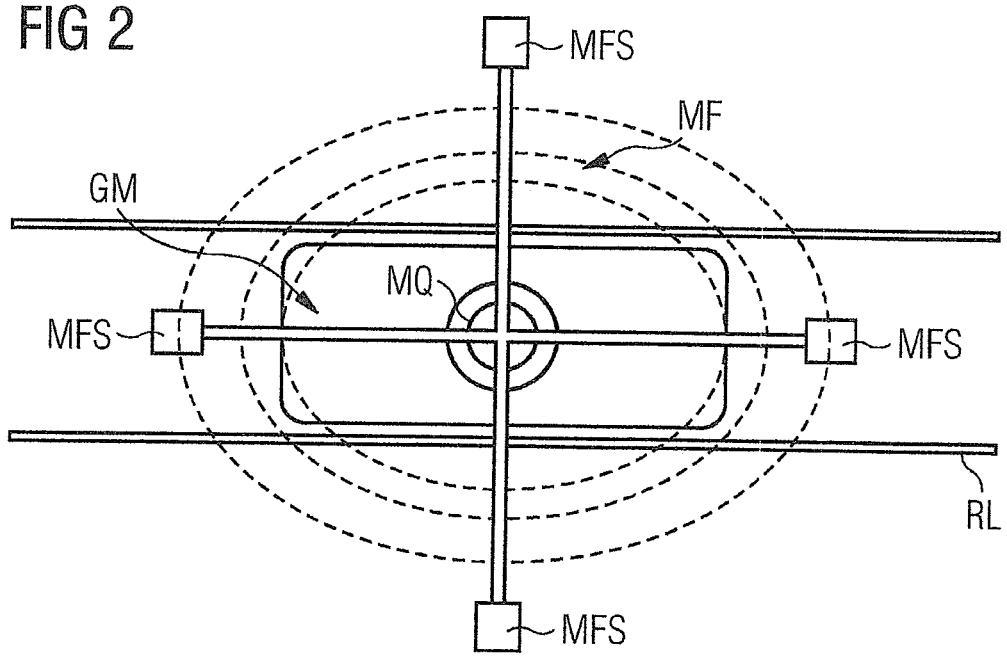
FIG. 2 shows the use of the system in accordance with the invention in a plan view.

It may also be advantageous to equip the unmanned aerial vehicle UAV with a plurality of magnetic field sensors MFS and to arrange these sensors in the form of a cross, as is illustrated in FIG. 2. Consequently, the localization of the geopig GM and thus of the pipeline RL is improved in the lateral direction by virtue of the detection results being at a maximum.

In a further advantageous embodiment of the invention, the magnetic field is also used simultaneously for detecting weak points in the pipeline casing or for detecting irregularities in the ground lying above the pipeline (for example, "illegal tapping" via attaching branch lines).

A bi-directional measurement would also be conceivable, in that the signal that is measured via the magnetic field probe MFS is returned, for example, at another lower frequency to the geopig GM. As a consequence, it is possible using suitable coding over the propagation delay time of the signals to determine the distance between the unmanned aerial vehicle UAV and the geopig GM.

Alternatively, it would also be conceivable to measure the distance by comparing the phase position of the signals.

The advantages that are achieved using the system in accordance with the invention particularly reside in a high degree of accuracy when determining the position of the geopig GM, above all in the case of comparatively long pipelines RL, by eliminating the drift behavior of the incremental measurement using an inertial measuring system.

Consequently, it is also possible to use comparatively simple and cost-effective measuring systems in the geopig GM.

Furthermore, the system renders it possible to fully automate the measuring procedure.

The invention claimed is:

1. A system for determining a location of at least one pipeline having at least one geopig which is introduced into the at least one pipeline, moved forward in said at least one pipeline and which comprises a magnetic source for generating a magnetic field, the system comprising:
   at least one unmanned aerial vehicle having position determining devices;
   a plurality of magnetic field sensors attached to the at least one unmanned aerial vehicle and arranged in a cross-shaped manner which detect a course of a field strength of the magnetic field and maintain positioning of the at least one unmanned aerial vehicle at a defined distance from the at least one geopig; and
   means for determining a location of the geopig from a position of the at least one unmanned aerial vehicle and the defined distance between the at least one geopig and the at least one unmanned aerial vehicle.

2. The system as claimed in claim 1, wherein the position determining devices of the unmanned aerial vehicle comprise satellite navigation components.

3. The system as claimed in claim 2, wherein the location of the pipeline is determined from a sequence of ascertained positions of the at least one geopig while moving.

4. The system as claimed in claim 1, wherein the at least one geopig is moved forward via flow of a medium being transported in the pipeline.

5. The system as claimed in claim 2, wherein the at least one geopig is moved forward via flow of a medium being transported in the pipeline.

6. The system as claimed in claim 4, wherein the location of the pipeline is determined from a sequence of ascertained positions of the at least one geopig while moving.

7. The system as claimed in claim 1, wherein the location of the pipeline is determined from a sequence of ascertained positions of the at least one geopig while moving.

8. The system as claimed in claim 1, wherein the magnetic source comprises a coil to which an alternating current is applied; and wherein the alternating current comprises a typical and distinguishable frequency pattern.

9. The system as claimed in claim 1, wherein the magnetic field comprises a constant field having an alternating field superimposed on said constant field.

* * * * *